US011256814B2

(12) United States Patent
Riley et al.

(10) Patent No.: US 11,256,814 B2
(45) Date of Patent: Feb. 22, 2022

(54) APPLICATION SELECTION BASED ON CUMULATIVE VULNERABILITY RISK ASSESSMENT

(71) Applicant: Kyndryl, Inc., New York, NY (US)

(72) Inventors: Daniel S. Riley, Wake Forest, NC (US); Rhonda L. Childress, Austin, TX (US)

(73) Assignee: KYNDRYL, INC., New York, NY (US)

(*) Notice: Subject to any disclaimer, the term of this patent is extended or adjusted under 35 U.S.C. 154(b) by 100 days.

(21) Appl. No.: 16/819,313

(22) Filed: Mar. 16, 2020

(65) Prior Publication Data

US 2021/0286880 A1   Sep. 16, 2021

(51) Int. Cl.
*G06F 21/51*  (2013.01)
*G06F 21/54*  (2013.01)
*G06F 21/57*  (2013.01)

(52) U.S. Cl.
CPC ............ *G06F 21/577* (2013.01); *G06F 21/51* (2013.01); *G06F 21/54* (2013.01)

(58) Field of Classification Search
CPC ........ G06F 21/577; G06F 21/54; G06F 21/51; G06F 21/55; G06F 8/65
See application file for complete search history.

(56) References Cited

U.S. PATENT DOCUMENTS

| | | |
|---|---|---|
| 6,895,383 B2 | 5/2005 | Heinrich |
| 8,050,993 B2 | 11/2011 | Del Bianco et al. |
| 8,595,845 B2 * | 11/2013 | Basavapatna ....... H04L 63/1433 726/25 |
| 10,192,058 B1 | 1/2019 | Jalil et al. |
| 2013/0247205 A1 * | 9/2013 | Schrecker ............ G06F 21/577 726/25 |

(Continued)

OTHER PUBLICATIONS

"Risk Patrol: A Risk Management System Considering the Integration Risk Management with Business Continuity Processes"—Cha et al, IEEE International Conference on Intelligence and Security Informatics, Jun. 20, 2008 (Year: 2008).*

(Continued)

*Primary Examiner* — Randy A Scott
(74) *Attorney, Agent, or Firm* — Garg Law Firm, PLLC; Rakesh Garg; Ken Han

(57) ABSTRACT

Using a processor and a memory of a testing system, a set of vulnerability testing instructions is executed relative to an application, causing an output of a set of vulnerabilities from the testing system. By executing a probability model, a first probability of adverse impact corresponding to a first vulnerability in the set of vulnerabilities is computed. The first vulnerability and the first probability of adverse impact are added to a vulnerability repository. Using the first probability of adverse impact and a second probability of adverse impact, a first cumulative probability of adverse impact is calculated. Using the first cumulative probability and a first level of organizational impact corresponding to the application, a first risk category is assigned to the application. Responsive to the first risk category being lower than a second risk category, a system management application is caused to install the application in the computer system.

17 Claims, 15 Drawing Sheets

(56) References Cited

U.S. PATENT DOCUMENTS

2018/0191770 A1* 7/2018 Nachenberg .......... G06F 21/554
2019/0034846 A1   1/2019 Mo et al.
2019/0044969 A1   2/2019 Pilkington et al.

OTHER PUBLICATIONS

"Knowledge Driven Enterprise Risk Management"—Nayak et al, 2012 Annual SRII Global Conference, Nov. 14, 2012 https://ieeexplore.IEEE.org/stamp/stamp.jsp?tp=&arnumber=6311039 (Year: 2012).*

Cha et al., RiskPatrol: A Risk Management System Considering the Integration Risk Management with Business Continuity Processes, 2008 IEEE International Conference on Intelligence and Security Informatics, Jun. 17-20, 2008, pp. 110-115.

Nayak et al., Knowledge Driven Enterprise Risk Management, 2012 Annual SRII Global Conference,! Jan. 14, 2012, pp. 564-573, IEEE.

* cited by examiner

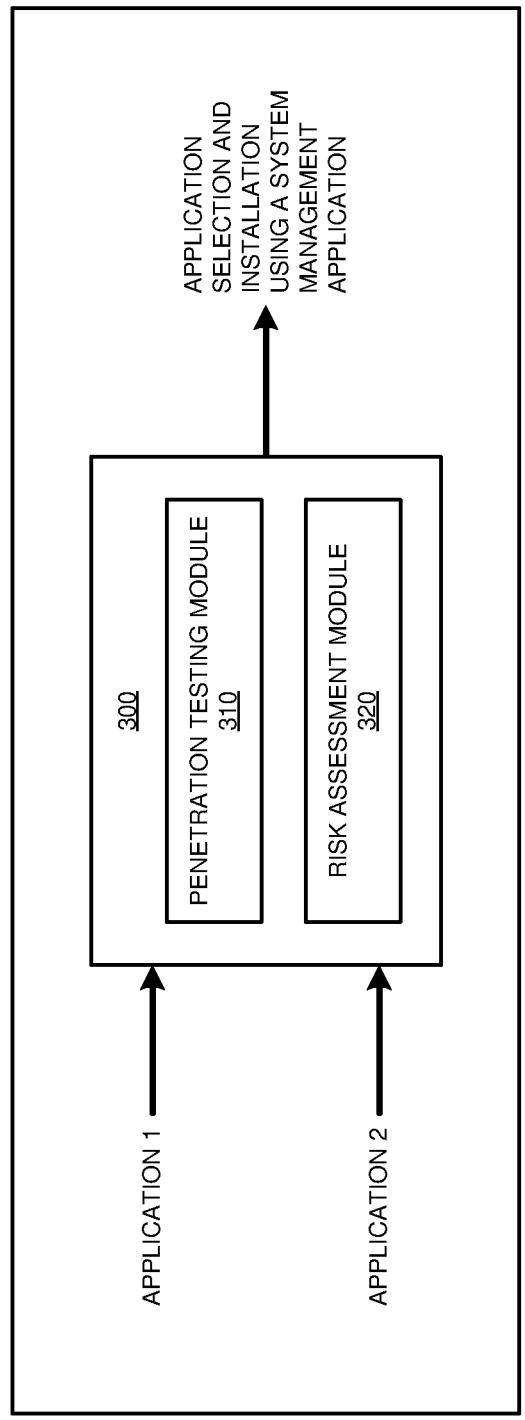

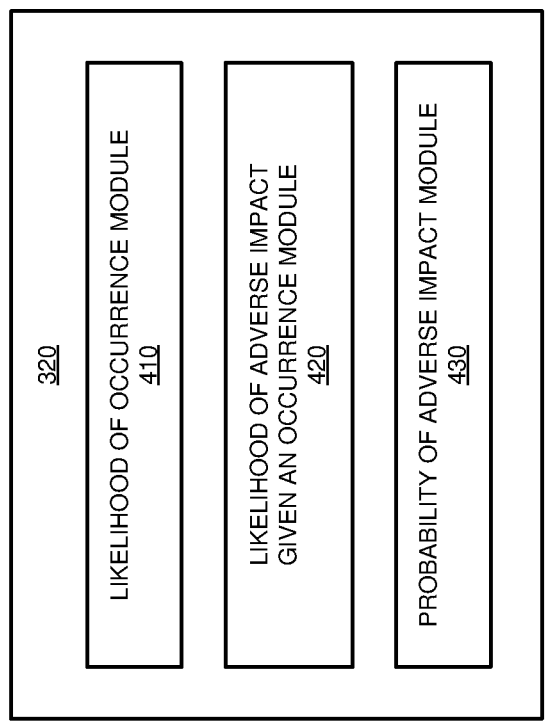

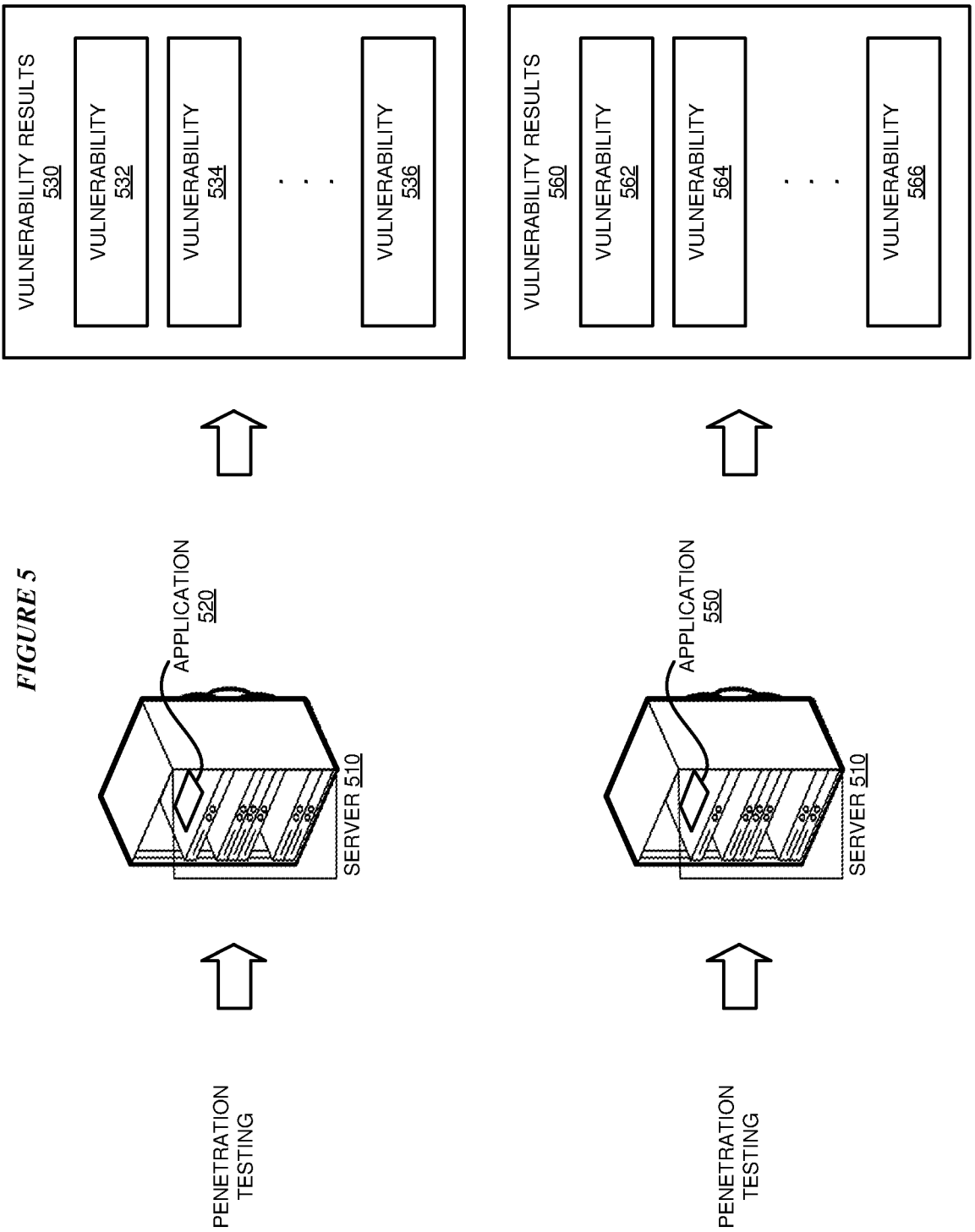

*FIGURE 6A*

TABLE
610

ASSESSMENT SCALE – LIKELIHOOD OF THREAT EVENT INITIATION (ADVERSARIAL),
FROM NIST 800-30 TABLE G2

| QUALITATIVE VALUES | SEMI-QUANTITATIVE VALUES | DESCRIPTION |
|---|---|---|
| VERY HIGH | 96-100 | 10 | ADVERSARY IS ALMOST CERTAIN TO INITIATE THE THREAT EVENT. |
| HIGH | 80-95 | 8 | ADVERSARY IS HIGHLY LIKELY TO INITIATE THE THREAT EVENT. |
| MODERATE | 21-79 | 5 | ADVERSARY IS SOMEWHAT LIKELY TO INITIATE THE THREAT EVENT. |
| LOW | 5-20 | 2 | ADVERSARY IS UNLIKELY TO INITIATE THE THREAT EVENT. |
| VERY LOW | 0-4 | 0 | ADVERSARY IS HIGHLY UNLIKELY TO INITIATE THE THREAT EVENT. |

CONVERSION 612 : $P(TEI) = \dfrac{MAX_L - MIN_L}{2} + MIN_L = \dfrac{(20-5)}{2} + 5 = 12.5$

VULNERABILITY
532

FIGURE 6C
CONVERSION 612 : $P(TEI) = \frac{MAX_L - MIN_L}{2} + MIN_L = \frac{(20-5)}{2} + 5 = 12.5$
RESULT 630 : $P(AI) = P(TEI) * P(TEIRAI)/100 = 12.5*50/100 = 6.25$
CONVERSION 622 : $P(TEIRAI) = \frac{MAX_M - MIN_M}{2} + MIN_M = \frac{(79-21)}{2} + 21 = 50$

FIGURE 8

| LIKELIHOOD (THREAT EVENT OCCURS AND RESULTS IN ADVERSE IMPACT) | LEVEL OF IMPACT | | | | |
|---|---|---|---|---|---|
| | VERY LOW | LOW | MODERATE | HIGH | VERY HIGH |
| VERY HIGH | VERY LOW | LOW | MODERATE | HIGH | VERY HIGH |
| HIGH | VERY LOW | LOW | MODERATE | HIGH | VERY HIGH |
| MODERATE | VERY LOW | LOW | MODERATE | HIGH | VERY HIGH |
| LOW | VERY LOW | LOW | MODERATE | MODERATE | HIGH |
| VERY LOW | VERY LOW | VERY LOW | LOW | LOW | MODERATE |

TABLE 820
ASSESSMENT SCALE – LEVEL OF RISK (COMBINATION OF LIKELIHOOD AND IMPACT), FROM NIST 800 – 30 TABLE G5

LEVEL OF ORGANIZATIONAL IMPACT OF AN EXPLOIT OF VULNERABILITY RESULTS 810

CATEGORIZED PROBABILITY OF ADVERSE IMPACT 750

RISK CATEGORY 830

APPLICATION SELECTION BASED ON CUMULATIVE VULNERABILITY RISK ASSESSMENT

BACKGROUND

The present invention relates generally to a method, system, and computer program product for risk-based application selection. More particularly, the present invention relates to a method, system, and computer program product for application selection based on cumulative vulnerability risk assessment.

Vulnerability testing tests the security of a computer system or a computer application executing on the computer system. Some vulnerability testing provides data to the system or application and uses responses to the provided data to identify security weaknesses, also called vulnerabilities. Some vulnerability testing takes the form of an authorized simulated cyberattack on the system or application.

Some example vulnerabilities a vulnerability test identifies include injection, cross-site scripting flaws, and other flaws relating to remote code execution. Injection flaws can occur when hostile data is sent to an interpreter as part of a command or query, potentially tricking the interpreter into executing unintended commands or accessing data without proper authorization. Similarly, cross-site scripting flaws can occur when an application includes insufficiently validated data in a new or existing web page, allowing an attacker to execute a script in the victim's browser to hijack user sessions, deface web sites, or redirect the user to malicious sites. Other flaws relating to remote code execution can also allow an attacker to cause an application to execute the attacker's software. Example vulnerability tests also test whether application functions related to authentication and session management have been implemented correctly. If not, these functions can allow an attacker to compromise passwords, keys, or session tokens, or to exploit other implementation flaws to assume other users' identities. Example vulnerability tests also identify incomplete access control enforcement, which could allow an attacker to access other users' accounts, view sensitive files, modify other users' data, change access rights, and more. Example vulnerability tests also identify misconfigured and incompletely configured application security. In addition, example vulnerability tests also identify insufficiently protected data that, if exposed, can be used to conduct credit card fraud, identity theft, or other crimes.

Many organizations use qualitative or semi-quantitative scales to assess their Information Technology (IT) risks, including the risks of vulnerabilities identified using vulnerability testing. Typically, such qualitative or semi-quantitative scales are prescribed by a risk management framework. One non-limiting example of such a framework is specified in the National Institute of Standards and Technology's (NIST) "Guide for Conducting Risk Assessments", Special Publication 800-30. Risk management frameworks focus on identifying potential threat events and vulnerabilities that could be exploited by the potential threats, determining likelihoods of potential threats' resulting in adverse impacts and what those adverse impacts would be, and determining a risk based on the threats' impacts and likelihoods. However, each determination is performed using a qualitative scale, in which a determination is assigned to a category. For example, one qualitative scale uses the categories Very High, High, Moderate, Low, and Very Low. In some frameworks, each category is also assigned a numerical range (i.e. a semi-quantitative scale) or a specific number.

SUMMARY

The illustrative embodiments provide a method, system, and computer program product. An embodiment includes a method that executes, using a processor and a memory of a testing system, a set of vulnerability testing instructions relative to an application, the executing causing an output of a set of vulnerabilities from the testing system. An embodiment computes, by executing a probability model, a first probability of adverse impact corresponding to a first vulnerability in the set of vulnerabilities. An embodiment modifies a vulnerability repository in a data storage device, by adding to the vulnerability repository the first vulnerability and the first probability of adverse impact. An embodiment calculates, using the first probability of adverse impact and a second probability of adverse impact, a first cumulative probability of adverse impact. An embodiment assigns to the application, using the first cumulative probability and a first level of organizational impact corresponding to the application, a first risk category. An embodiment causes, responsive to the first risk category being lower than a second risk category, a system management application to install the application in the computer system.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example configuration for application selection based on cumulative vulnerability risk assessment in accordance with an illustrative embodiment;

FIG. 4 depicts a block diagram of an example configuration for application selection based on cumulative vulnerability risk assessment in accordance with an illustrative embodiment;

FIG. 5 depicts an example of application selection based on cumulative vulnerability risk assessment in accordance with an illustrative embodiment;

FIG. 6A depicts a continued example of application selection based on cumulative vulnerability risk assessment in accordance with an illustrative embodiment;

FIG. 6C depicts a continued example of application selection based on cumulative vulnerability risk assessment in accordance with an illustrative embodiment;

FIG. 8 depicts a continued example of application selection based on cumulative vulnerability risk assessment in accordance with an illustrative embodiment;

DETAILED DESCRIPTION

Figure 1:
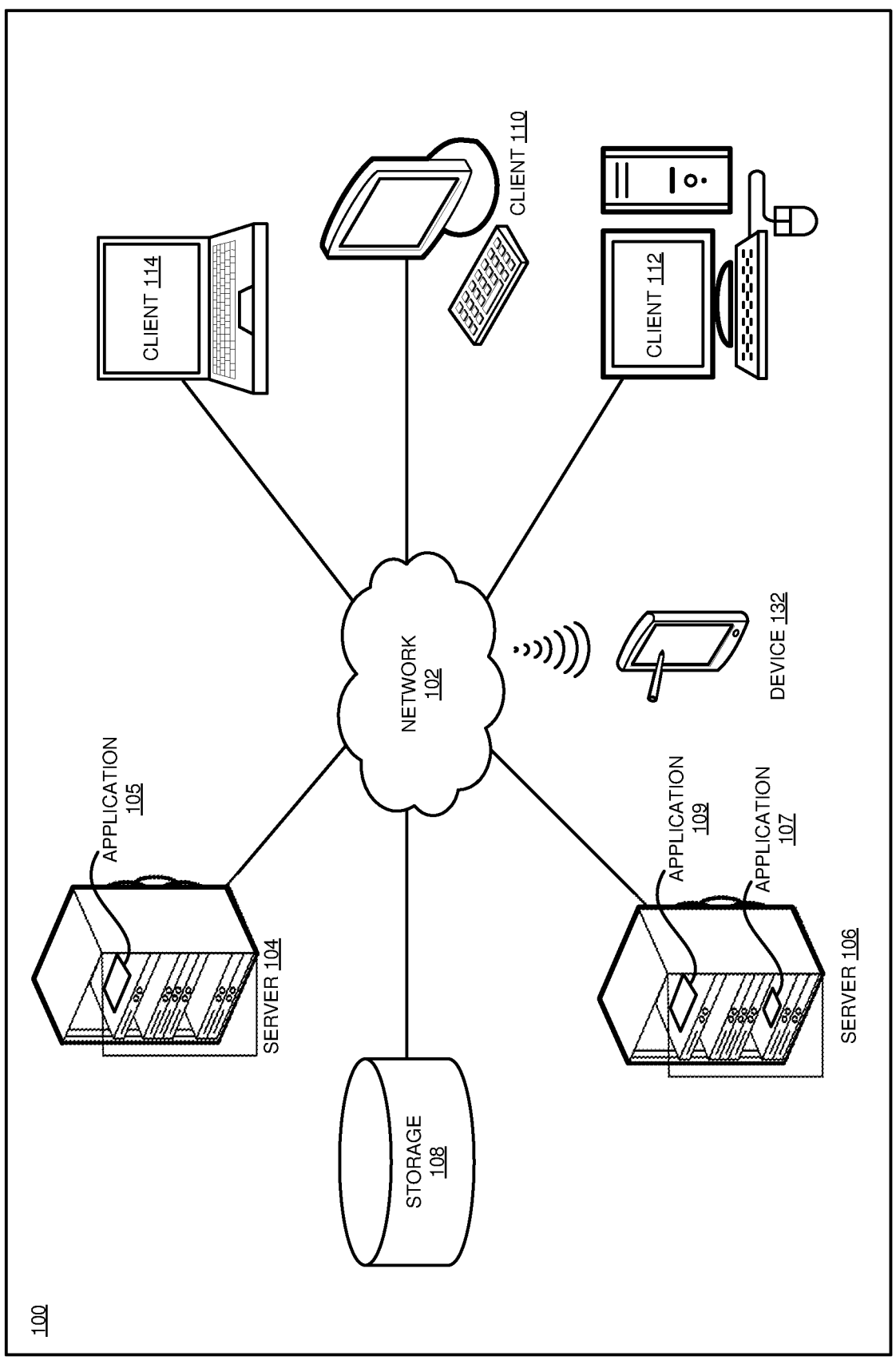
FIG. 1 depicts a block diagram of a network of data processing systems in which illustrative embodiments may be implemented.

The illustrative embodiments recognize that, when assessing software application quality, one important quality measure is the security risk associated with an application. For example, if application A and application B both provide the same functionality at the same cost, but application A has a higher security risk than application B, an organization might prefer application B, because selecting application B will likely result in less risk to the organization, and less cost associated with mitigating that risk, than application A.

The illustrative embodiments recognize that conventional risk management frameworks (e.g., the NIST "Guide for Conducting Risk Assessments"), while sufficient for assessing individual risks, are not usable to aggregate individual risks in order to better understand overall IT risk. In particular, frameworks implemented using assessment categories do not provide a method of combining the effects of multiple risks to the same system, application, or other IT asset. For example, if an organization has determined that an application is subject to two risks in the Low category and one risk in the Moderate category, the frameworks lack a method usable to combine all three risks into an overall risk for the application. Consequently, the illustrative embodiments recognize that there is an unmet need for cumulative application vulnerability risk assessment, for use in selecting an application for use in a computer system.

The illustrative embodiments recognize that the presently available tools or solutions do not address these needs or provide adequate solutions for these needs. The illustrative embodiments used to describe the invention generally address and solve the above-described problems and other problems related to application selection based on cumulative vulnerability risk assessment.

An embodiment can be implemented as a software application. The application implementing an embodiment can be configured as a modification of an existing application assessment system, as a separate application that operates in conjunction with an existing application assessment system, a standalone application, or some combination thereof.

Particularly, some illustrative embodiments provide a method that generates, by vulnerability testing a first application, a set of vulnerabilities corresponding to the first application. The method forecasts a probability of adverse impact for vulnerabilities in the set of vulnerabilities, calculates a cumulative probability of adverse impact for the set of vulnerabilities, and selects a risk category corresponding to the cumulative probability of adverse impact. If the risk category is lower than a risk category corresponding to another application, the method causes a system management application to install the first application.

An embodiment receives information about one or more applications, each executing in a computer system. An embodiment vulnerability tests at least one of the applications. The computer system in which an application is executing can be the same as, or different from, the computer system in which an embodiment is implemented.

To perform vulnerability testing, an embodiment uses one or more presently-available automated testing techniques implemented in executable computer code. For example, if an application includes an interpreter capability (e.g. to process Structured Query Language (SQL) or Lightweight Directory Access Protocol (LDAP) commands or queries), one vulnerability testing technique is to include random or hostile data in a command or query, to determine if the interpreter can be tricked into executing unintended commands or accessing data without proper authorization. Similarly, if an application can execute a script or perform another form of remote code execution, one vulnerability testing technique is to test whether the application properly validates data in a new or existing web page to prevent cross-site scripting flaws, or whether the application properly validates data intended for another form of remote code execution. Other example vulnerability testing techniques check authentication and session management implementations, access control enforcement, application security measures, and whether sensitive data is sufficiently protected.

An exploit is software code, or a technique that can be implemented in software code, that can be used to bypass security measures to gain access to a system. Exploits are often made public, to allow others using an application, technology, hardware, or type of operating system that is vulnerable to the exploit to protect themselves. However, as there is often a lag between when an exploit is publicly identified and when software is updated to prevent the exploit from being successful, an embodiment performs vulnerability testing using a set of publicly known exploits.

The vulnerability testing identifies one or more vulnerabilities of the application. Some non-limiting examples of vulnerabilities identified by vulnerability testing include injection, cross-site scripting flaws, and other flaws relating to remote code execution, which could cause an application to execute the attacker's software. Additional non-limiting examples of vulnerabilities identified by vulnerability testing include incorrect authentication and session management implementations, incomplete access control enforcement, and misconfigured or incompletely configured application security, as well as insufficiently protected data an application generates, manipulates, or stores.

An embodiment determines a probability of adverse impact corresponding to an identified vulnerability. One embodiment analyzes historical data of prior vulnerabilities and corresponding adverse impacts in determining components of a probability of adverse impact corresponding to an identified vulnerability.

One component of the probability of adverse impact is a probability of occurrence corresponding to a vulnerability. A probability of occurrence of the vulnerability is an assessment of the degree to which an adversary is likely to initiate a threat to an application using the vulnerability.

An embodiment determines a categorized likelihood of occurrence of the vulnerability. One embodiment uses two categories, High and Low. Another embodiment uses five categories, Very High, High, Moderate, Low, and Very Low. Other embodiments use other numbers of categories, other names for categories, or both.

One embodiment determines the categorized likelihood of occurrence according to the type of vulnerability, by assigning one or more vulnerability types to likelihood of occurrence categories. For example an embodiment might categorize all injection flaws and cross-site scripting flaws into a Moderate category, misconfigured or incompletely configured application security vulnerabilities into a High category, and insufficiently protected data-related vulnerabilities into a Low category.

Another embodiment determines the categorized likelihood of occurrence according to the type of vulnerability test that discovered the vulnerability, by assigning one or more test types to likelihood of occurrence categories. For example an embodiment might categorize vulnerabilities found using injection flaw and cross-site scripting flaw testing into a Low category, and vulnerabilities found using security configuration testing into a High category.

Another embodiment determines the categorized likelihood of occurrence according to whether or not a vulnerability is already publicly known. A publicly known exploit is already public and available for an attacker's use, but a not-yet-public attack requires additional work on the part of the attacker before it can be used. Thus, a categorized likelihood of occurrence for a vulnerability to a publicly known exploit is higher than a categorized likelihood of occurrence for a vulnerability to a non-public exploit. For example, in an embodiment using two categories, High and Low, a vulnerability to a publicly known exploit would have a categorized likelihood of occurrence of High and a vulnerability to a non-public known exploit would have a categorized likelihood of occurrence of Low. To determine whether or not an exploit is already publicly known, an embodiment consults a database, repository, or other compendium of reported exploits, searches publicly available information (e.g., on a network such as the Internet) for an announcement of a discovered exploit, or uses another presently-available technique.

Another embodiment determines the categorized likelihood of occurrence according to a discoverability category corresponding to the vulnerability. A publicly known exploit is already public and hence is in a maximally easy discoverability category. Another exploit might not yet be public, and be completely unrelated to any already-public exploits, and hence be in a maximally hard discoverability category. Another exploit might not yet be public, but be a trivial variation on an exploit that is already public—thus rating a discoverability category in between maximally easy and maximally hard. For example, in an embodiment using three categories, High, Moderate, and Low, a vulnerability to a publicly known exploit would have a categorized likelihood of occurrence of High, a vulnerability to an exploit in a category between maximally easy and maximally hard would have a categorized likelihood of occurrence of Moderate, and a vulnerability to an exploit with maximally hard discoverability would have a categorized likelihood of occurrence of Low.

Another embodiment determines the categorized likelihood of occurrence according to a network connectivity category corresponding to the vulnerability. Because a vulnerability is more likely to be exploited from outside an organization, an application executing in a system that is accessible from outside an organization's internal network or requiring the use of data from outside an organization's internal network is likely to face a higher probability of occurrence than an application executing in a system that is not accessible from outside an organization's internal network or that does not require the use of data from outside an organization's internal network.

Another embodiment determines the categorized likelihood of occurrence according to an attractiveness category corresponding to the vulnerability. Some data is more attractive to those seeking to exploit it than other data. As a result, a vulnerability that could result in exposure of highly attractive data, or a vulnerability in an application manipulating highly attractive data, is likely to face a higher probability of occurrence than a vulnerability that could result in exposure of data that is not highly attractive, or a vulnerability in an application that does not manipulate highly attractive data.

Another embodiment determines the categorized likelihood of occurrence according to a combination of factors. Another embodiment determines the categorized likelihood of occurrence according to a different categorization scheme.

An embodiment selects a probability of occurrence corresponding to a vulnerability. The probability is a numerical value corresponding to the categorized likelihood of occurrence of the vulnerability.

To select a numerical value of a probability of occurrence, one embodiment associates each category with a semi-quantitative score. For example, in an embodiment using five categories, Very High, High, Moderate, Low, and Very Low, corresponding semi-quantitative scores might be 10, 8, 5, 2, and 0.

To select a numerical value of a probability of occurrence, another embodiment associates each category with a range of semi-quantitative scores. For example, in an embodiment using five categories, Very High, High, Moderate, Low, and Very Low, corresponding ranges might be 96-100, 80-95, 21-79, 5-20, and 0-4. An embodiment reduces a range to a single numerical value by selecting the lowest value in the range, the highest value in the range, the midpoint of the range, the median or average of the integers in the range, or another presently-available technique. To calculate the midpoint of a range, an embodiment uses the expression $((max_r - min_r)/2) + min_r$, where $max_r$ represents the maximum value in the range and $min_r$ represents the minimum value in the range. For example, for ranges 96-100, 80-95, 21-79, 5-20, and 0-4, corresponding single numerical values obtained by selecting the midpoint of each range are 98.0, 87.5, 50.0, 12.5, and 2.0.

Another embodiment omits categorization and selection, and determines a numerical value for a probability of occurrence corresponding to a vulnerability directly. Another embodiment uses categorization and selection for one vulnerability, and determines a numerical value for a probability of occurrence corresponding to a vulnerability directly for a different vulnerability.

Another component of an embodiment's determination of the probability of adverse impact is a probability that the vulnerability, if it occurs, will have an adverse impact.

An embodiment determines a categorized likelihood of adverse impact given an occurrence of the vulnerability. One embodiment uses two categories, High and Low. Another embodiment uses five categories, Very High, High, Moderate, Low, and Very Low. Other embodiments use other numbers of categories, other names for categories, or both.

One embodiment determines the categorized likelihood of adverse impact given an occurrence of the vulnerability according to the type of vulnerability, by assigning one or more vulnerability types to adverse impact categories. For example an embodiment might categorize all injection flaws and cross-site scripting flaws into a Moderate category, misconfigured or incompletely configured application security vulnerabilities into a High category, and insufficiently protected data-related vulnerabilities into a Low category.

Another embodiment determines the categorized likelihood of adverse impact given an occurrence of the vulnerability according to the type of vulnerability test that discovered the vulnerability, by assigning one or more test types to adverse impact categories. For example an embodiment might categorize vulnerabilities found using injection flaw and cross-site scripting flaw testing into a Low category, and vulnerabilities found using security configuration testing into a High category.

Another embodiment determines the categorized likelihood of adverse impact given an occurrence of the vulnerability according to a combination of factors. Another embodiment determines the categorized likelihood of adverse impact given an occurrence of the vulnerability according to a different categorization scheme.

An embodiment selects a probability of adverse impact given an occurrence of the vulnerability. The probability is a numerical value corresponding to the categorized likelihood of adverse impact given an occurrence of the vulnerability of the vulnerability.

To select a numerical value for a probability of adverse impact given an occurrence of the vulnerability, an embodiment associates each category with a semi-quantitative score, or a range of semi-quantitative scores each reduced to a single numerical value in a manner described herein. The number of categories and score ranges for each category used in computing a probability of occurrence and a probability of adverse impact given an occurrence of the vulnerability need not be the same.

Another embodiment omits categorization and selection, and determines a numerical value for a probability of adverse impact given an occurrence of a vulnerability directly. Another embodiment uses categorization and selection for one vulnerability, and determines a numerical value for a probability of adverse impact given an occurrence of a vulnerability directly for a different vulnerability.

An embodiment normalizes the probability of occurrence and probability of adverse impact given an occurrence of a vulnerability to a common scale, then multiplies the probabilities together to obtain an overall probability of adverse impact corresponding to an identified vulnerability.

An embodiment maintains one or more identified vulnerabilities, and probabilities of adverse impact corresponding to each vulnerability, in a vulnerability repository. An embodiment implements the vulnerability repository using a database, set of memory locations, file, or another presently-available technique. Maintaining vulnerabilities and probabilities of adverse impact in a repository allows reuse of vulnerability information when comparing vulnerability test results of different applications. Maintaining vulnerabilities and probabilities of adverse impact in a repository also allows determination of application improvement information, and forecasting application vulnerability and improvement trends. For example, if weekly vulnerability testing of application A reveals a steadily decreasing number of vulnerabilities, one can conclude that a developer of application A is updating application A to eliminate vulnerabilities, and forecast that this improvement is likely to continue. However, if weekly vulnerability testing of application B reveals a steady number of vulnerabilities of one particular type, one can conclude that a developer of application B is not updating application B to protect against this type of vulnerability, and that exploits against application B using this type of vulnerability are likely to continue.

An embodiment calculates a cumulative probability of adverse impact corresponding to an application from one or more probabilities of adverse impact corresponding to identified vulnerabilities of the application. The cumulative probability corresponding to an application is the probability that at least one of the probabilities of adverse impact corresponding to a vulnerability will happen. Thus, if there are two probabilities of adverse impact corresponding to identified vulnerabilities, v1 and v2, each expressed as a percentage, an embodiment calculates the cumulative probability (P(AI)), also expressed as a percentage, using the expression:

$$P(AI) = 100 - \left(\frac{100 - v1}{100}\right) * \left(\frac{100 - v2}{100}\right).$$

If there are three probabilities of adverse impact corresponding to identified vulnerabilities, v1, v2, and v3, an embodiment calculates the cumulative probability (P(AI)) using the expression:

$$P(AI) = 100 - \left(\frac{100 - v1}{100}\right) * \left(\frac{100 - v2}{100}\right) * \left(\frac{100 - v3}{100}\right).$$

If there are four probabilities of adverse impact corresponding to identified vulnerabilities, v1, v2, v3, and v4, an embodiment calculates the cumulative probability (P(AI)) using the expression:

$$P(AI) = 100 - \left(\frac{100 - v1}{100}\right) * \left(\frac{100 - v2}{100}\right) * \left(\frac{100 - v3}{100}\right) * \left(\frac{100 - v4}{100}\right).$$

If there are additional probabilities of adverse impact corresponding to identified vulnerabilities, an embodiment extends the expression to include the additional terms.

An embodiment categorizes a cumulative probability of adverse impact corresponding to an application. One embodiment uses two categories, High and Low. Another embodiment uses five categories, Very High, High, Moderate, Low, and Very Low. Other embodiments use other numbers of categories, other names for categories, or both. Each category corresponds to a numerical range. For example, in an embodiment using five categories, Very High, High, Moderate, Low, and Very Low, corresponding numerical ranges might be 96-100, 80-95, 21-79, 5-20, and 0-4, where each number represents a probability percentage. Thus, a cumulative probability of adverse impact corresponding to an application is 41.29 percent would be assigned to the Moderate category.

An embodiment determines or receives a level of organizational impact corresponding to the application being evaluated. The level of organization impact represents a categorized assessment of an amount by which the organization will be impacted by a successful exploit on the application. One embodiment uses two categories, High and Low. Another embodiment uses five categories, Very High, High, Moderate, Low, and Very Low. Other embodiments use other numbers of categories, other names for categories, or both. For example, a payroll application might be categorized in a Very High category, because a successful exploit on the application could render the organization unable to pay employees. In contrast, an application intended for creating graphical elements for user manuals might be categorized in a Low category, because a successful exploit on the application will have little effect on day-to-day operations and workarounds for the affected application are available.

Using the categorized cumulative probability of adverse impact and the level of organizational impact corresponding to an application being evaluated, an embodiment selects a risk category corresponding to the application. In one embodiment, the categorized cumulative probability of adverse impact is represented by one dimension of a two-dimensional table, the level of organizational impact is represented by a second dimension of the table, and the selected risk category is represented by the intersection of the two dimensions. Another embodiment uses a different data representation to select the risk category. Another embodiment does not consider the level of organizational impact, and selects a risk category corresponding to the categorized cumulative probability of adverse impact. Another embodiment does not consider the level of organizational impact, and selects a risk category corresponding to the numerical value of the cumulative probability of adverse impact. Another embodiment does not consider the level of organizational impact, and uses, as a numerical risk, the numerical value of the categorized probability of adverse impact. Other techniques for selecting a risk category or numerical risk selection using a categorized or numeric cumulative probability of adverse impact are also possible, and the same are contemplated within the scope of the illustrative embodiments.

An embodiment uses the selected risk category or numerical risk value to compare an application being evaluated against one or more other applications being evaluated. Because an application with a lower risk is likely to be better than an application with a higher risk, one embodiment causes a system management application to install the application with the lowest risk category or numerical risk value in a computer system. Another embodiment reports the application's risk category or numerical risk value, for use in an application evaluation process that includes additional factors besides risk. If that application evaluation process selects an application for implementation, an embodiment receives the selection information and causes a system management application to install the selected application in a computer system.

The manner of application selection based on cumulative vulnerability risk assessment described herein is unavailable in the presently available methods in the technological field of endeavor pertaining to risk assessment of software applications. A method of an embodiment described herein, when implemented to execute on a device or data processing system, comprises substantial advancement of the functionality of that device or data processing system in generating, by vulnerability testing a first application, a set of vulnerabilities corresponding to the first application. The method forecasts a probability of adverse impact for vulnerabilities in the set of vulnerabilities, calculates a cumulative probability of adverse impact for the set of vulnerabilities, and selects a risk category corresponding to the cumulative probability of adverse impact. If the risk category is lower than a risk category corresponding to another application, the method causes a system management application to install the first application.

The illustrative embodiments are described with respect to certain types of vulnerability tests, vulnerabilities, exploits, adverse impacts, risks, categories, numerical ranges, probabilities, likelihoods, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
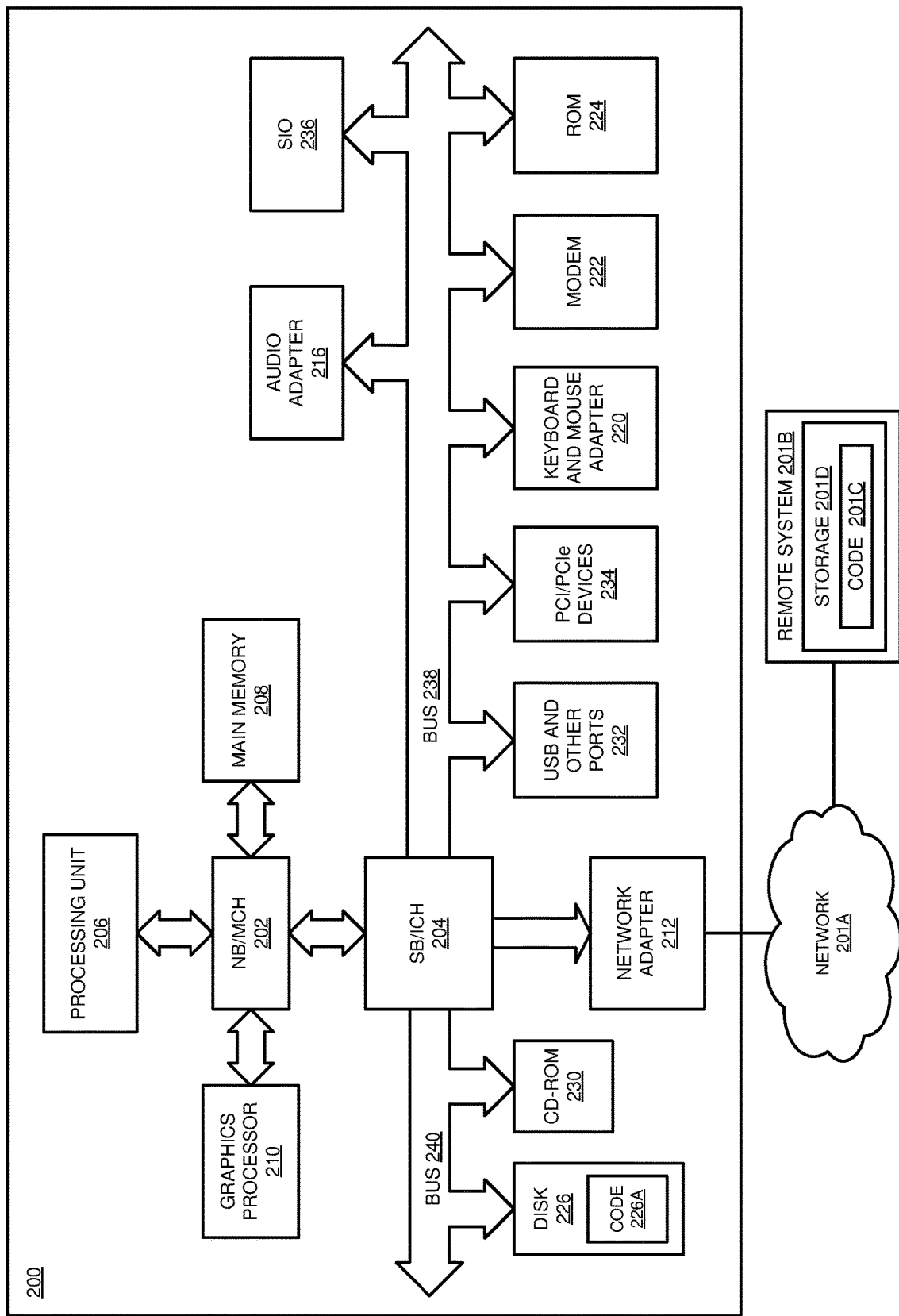
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Application 105 vulnerability tests and evaluates one or more of applications 107 and 109, executing in any of servers 104 and 106, clients 110, 112, and 114, and device 132. Depending on the risk assessment results, application 105 causes a system management application to install one of applications 107 and 109 in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

With reference to FIG. 3, this figure depicts a block diagram of an example configuration for application selection based on cumulative vulnerability risk assessment in accordance with an illustrative embodiment. Application 300 is an example of application 105 in FIG. 1 and executes in any of servers 104 and 106, clients 110, 112, and 114, and device 132 in FIG. 1.

Application 300 receives information about one or more applications (e.g. application 1 and application 2), each executing in a computer system. Vulnerability testing module 310 vulnerability tests at least one of the applications. To perform vulnerability testing, module 310 uses one or more presently-available testing techniques implemented in executable computer code, in a manner described herein. The vulnerability testing identifies one or more vulnerabilities of the application.

Risk assessment module 320 determines a probability of adverse impact corresponding to an identified vulnerability, and maintains one or more identified vulnerabilities, and probabilities of adverse impact corresponding to each vulnerability, in a vulnerability repository.

Module 320 calculates a cumulative probability of adverse impact corresponding to an application from one or more probabilities of adverse impact corresponding to identified vulnerabilities of the application. The cumulative probability corresponding to an application is the probability that at least one of the probabilities of adverse impact corresponding to a vulnerability will happen. Thus, if there are four probabilities of adverse impact corresponding to identified vulnerabilities, v1, v2, v3, and v4, module 320 calculates the cumulative probability (P(AI)) using the expression:

$$P(AI) = 100 - \left(\frac{100-v1}{100}\right) * \left(\frac{100-v2}{100}\right) * \left(\frac{100-v3}{100}\right) * \left(\frac{100-v4}{100}\right).$$

If there are additional or fewer probabilities of adverse impact corresponding to identified vulnerabilities, module 320 modifies the expression to accommodate the additional or fewer terms.

Module 320 categorizes a cumulative probability of adverse impact corresponding to an application, using two or more categories. Each category corresponds to a numerical range. Module 320 also determines or receives a level of organizational impact corresponding to the application being evaluated. The level of organization impact represents a categorized assessment of an amount by which the organization will be impacted by a successful exploit on the application.

Using the categorized cumulative probability of adverse impact and the level of organizational impact corresponding to an application, module 320 selects a risk category corresponding to the application. In one implementation of module 320, the categorized cumulative probability of adverse impact is represented by one dimension of a two-dimensional table, the level of organizational impact is represented by a second dimension of the table, and the selected risk category is represented by the intersection of the two dimensions. Another implementation of module 320 does not consider the level of organizational impact, and selects a risk category corresponding to the categorized or numerical cumulative probability of adverse impact. Another implementation of module 320 does not consider the level of organizational impact, and uses, as a numerical risk, the numerical value of the categorized probability of adverse impact.

Application 300 uses the selected risk category or numerical risk value to compare an application being evaluated against one or more other applications being evaluated. Because an application with a lower risk is likely to be better than an application with a higher risk, one implementation of application 300 causes a system management application to install the application with the lowest risk category or numerical risk value in a computer system. Another implementation of application 300 reports the risk category or numerical risk value of the application being evaluated, for use in an application evaluation process that includes additional factors besides risk.

With reference to FIG. 4, this figure depicts a block diagram of an example configuration for application selection based on cumulative vulnerability risk assessment in accordance with an illustrative embodiment. In particular, FIG. 4 depicts more detail of block 320 in FIG. 3.

Likelihood of occurrence module 410 determines a categorized likelihood of occurrence of the vulnerability. Implementations of module 410 use two or more categories, with differing names. For example, one implementation of module 410 uses five categories, Very High, High, Moderate, Low, and Very Low.

One implementation of module 410 determines the categorized likelihood of occurrence according to the type of vulnerability, by assigning one or more vulnerability types to likelihood of occurrence categories. Another implementation of module 410 determines the categorized likelihood of occurrence according to the type of vulnerability test that discovered the vulnerability, by assigning one or more test types to likelihood of occurrence categories. Another implementation of module 410 determines the categorized likelihood of occurrence according to whether or not a vulnerability is already publicly known, by consulting a database, repository, or other compendium of reported exploits, searching publicly available information (e.g., on a network such as the Internet) for an announcement of a discovered exploit, or using another presently-available technique. Another implementation of module 410 determines the categorized likelihood of occurrence according to a discoverability category corresponding to the vulnerability. Another implementation of module 410 determines the categorized likelihood of occurrence according to a combination of factors.

Module 410 selects a probability of occurrence, a numerical value corresponding to the categorized likelihood of occurrence of the vulnerability. To select a numerical value of a probability of occurrence, one implementation of module 410 associates each category with a semi-quantitative score. To select a numerical value of a probability of occurrence, another implementation of module 410 associates each category with a range of semi-quantitative scores, then reduces the range to a single numerical value by selecting the lowest value in the range, the highest value in the range, the midpoint of the range, the median or average of the integers in the range, or another presently-available technique. In other implementations of module 320, module 410 omits categorization and selection, and determine a numerical value for a probability of occurrence corresponding to a vulnerability directly.

Likelihood of adverse impact given an occurrence module 420 determines a categorized likelihood of adverse impact given an occurrence of the vulnerability. Implementations of module 420 use two or more categories, with differing names. For example, one implementation of module 420 uses five categories, Very High, High, Moderate, Low, and Very Low.

One implementation of module 420 determines the categorized likelihood of adverse impact given an occurrence of the vulnerability according to the type of vulnerability, by assigning one or more vulnerability types to adverse impact categories. Another implementation of module 420 determines the categorized likelihood of adverse impact given an occurrence of the vulnerability according to the type of vulnerability test that discovered the vulnerability, by assigning one or more test types to adverse impact categories. Another implementation of module 420 determines the categorized likelihood of adverse impact given an occurrence of the vulnerability according to a combination of factors.

Module 420 selects a probability, a numerical value corresponding to the categorized likelihood of adverse impact given an occurrence of the vulnerability. To select a numerical value for a probability of adverse impact given an occurrence of the vulnerability, module 420 associates each category with a semi-quantitative score, or a range of semi-quantitative scores each reduced to a single numerical value in a manner described herein. The number of categories and score ranges for each category used in computing a probability of occurrence and a probability of adverse impact given an occurrence of the vulnerability need not be the same. In other implementations of module 320, module 420 omits categorization and selection, and determine a numerical value for a probability of adverse impact given an occurrence of the vulnerability directly.

Probability of adverse impact module 430 normalizes the probability of occurrence and probability of adverse impact given an occurrence of a vulnerability to a common scale, then multiplies the probabilities together to obtain an overall probability of adverse impact corresponding to an identified vulnerability.

With reference to FIG. 5, this figure depicts an example of application selection based on cumulative vulnerability risk assessment in accordance with an illustrative embodiment. The example can be executed using application 300 in FIG. 3.

As depicted, an application performs vulnerability testing on application 520 executing in server 510, generating vulnerability result set 530. Vulnerability result set 530 includes vulnerabilities 532, 534, and 536. An application also performs vulnerability testing on application 550 executing in server 510, generating vulnerability result set 560. Vulnerability result set 560 includes vulnerabilities 562, 564, and 566.

With reference to FIG. 6A, this figure depicts a continued example of application selection based on cumulative vulnerability risk assessment in accordance with an illustrative embodiment. Vulnerability 532 is the same as vulnerability 532 in FIG. 5.

An application determines that vulnerability 532 has a categorized likelihood of occurrence in the Low category. To selects a numerical value of a probability of occurrence corresponding to vulnerability 532, the application consults table 610. Table 610 includes five categories, each with a corresponding numeric range. Note that table 610 is based on Table G2 of the NIST "Guide for Conducting Risk Assessments"), and is used only as an example. No particular number of categories, corresponding numeric range, or security framework is recommended or endorsed. Because vulnerability 532 is in the Low category, the application performs conversion 612 to determine the midpoint of the numerical range for the Low category, 5-20. The resulting value for the probability of occurrence corresponding to vulnerability 532 is 12.5 percent.

Figure 6B:
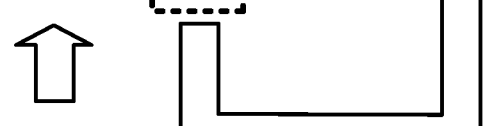
FIG. 6B depicts a continued example of application selection based on cumulative vulnerability risk assessment in accordance with an illustrative embodiment.

With reference to FIG. 6B, this figure depicts a continued example of application selection based on cumulative vulnerability risk assessment in accordance with an illustrative embodiment. Vulnerability 532 is the same as vulnerability 532 in FIG. 5.

An application determines that vulnerability 532 has a categorized likelihood of adverse impact given an occurrence of the vulnerability in the Moderate category. To selects a corresponding numerical value corresponding to vulnerability 532, the application consults table 620. Table 620 includes five categories, each with a corresponding numeric range. Note that table 620 is based on Table G4 of the NIST "Guide for Conducting Risk Assessments"), and is used only as an example. No particular number of categories, corresponding numeric range, or security framework is recommended or endorsed. Because vulnerability 532 is in the Moderate category, the application performs conversion 622 to determine the midpoint of the numerical range for the Moderate category, 21-79. The resulting value for the probability of adverse impact given an occurrence of vulnerability 532 is 50 percent.

With reference to FIG. 6C, this figure depicts a continued example of application selection based on cumulative vulnerability risk assessment in accordance with an illustrative embodiment. Conversion 612 is the same as conversion 612 in FIG. 6A. Conversion 622 is the same as conversion 622 in FIG. 6B.

An application multiplies the result of conversion 612, the probability of occurrence, and the result of conversion 622, the probability of adverse impact given an occurrence of a vulnerability, both normalized to a common scale, together to obtain result 630, an overall probability of adverse impact corresponding to vulnerability 532

Figure 7:
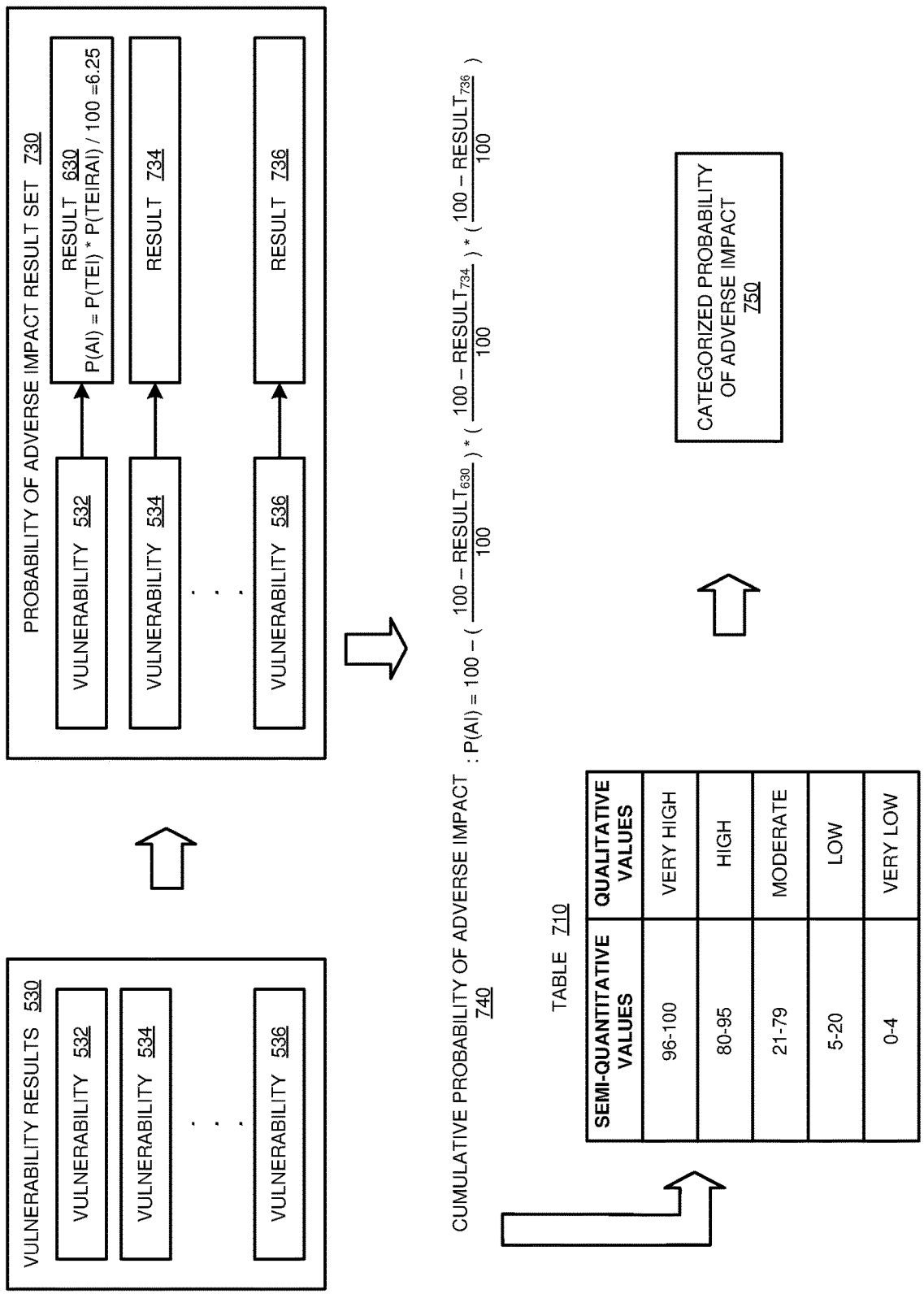
FIG. 7 depicts a continued example of application selection based on cumulative vulnerability risk assessment in accordance with an illustrative embodiment.

With reference to FIG. 7, this figure depicts a continued example of application selection based on cumulative vulnerability risk assessment in accordance with an illustrative embodiment. Vulnerability result set 530 and vulnerabilities 532, 534, and 536 are the same as vulnerability result set 530 and vulnerabilities 532, 534, and 536 in FIG. 5. Result 630 is the same as result 630 in FIG. 6C.

An application has computed additional probabilities of adverse impact corresponding to vulnerabilities 534 and 536, resulting in results 734 and 736 respectively. Results 630, 734, and 736 are part of result set 730. Result set 730 is maintained in a vulnerability repository.

An application calculates cumulative probability of adverse impact 740 from the results in result set 730. The cumulative probability corresponding to an application is the probability that at least one of the probabilities of adverse impact corresponding to a vulnerability will happen. Thus, probability 740, expressed as percentage, is calculated using the expression:

$$P(AI) = 100 - \left(\frac{100 - \text{result}630}{100}\right) * \left(\frac{100 - \text{result}734}{100}\right) * \left(\frac{100 - \text{result}736}{100}\right).$$

An application categorizes probability 740 using table 710. Table 710 includes five categories, each with a corresponding numeric range. Note that table 710 is based on tables in the NIST "Guide for Conducting Risk Assessments"), and is used only as an example. No particular number of categories, corresponding numeric range, or security framework is recommended or endorsed. The result is categorized cumulative probability of adverse impact 750.

With reference to FIG. 8, this figure depicts a continued example of application selection based on cumulative vulnerability risk assessment in accordance with an illustrative embodiment. Categorized cumulative probability of adverse impact 750 is the same as categorized cumulative probability of adverse impact 750 in FIG. 7.

An application determines or receives block 810, a level of organizational impact corresponding to the results in result set 530. The level of organization impact represents a categorized assessment of an amount by which the organization will be impacted by a successful exploit on the application.

Using categorized cumulative probability of adverse impact 750 and level 810, an application selects a risk category corresponding to the results in result set 530. To select a risk category, the application uses table 820. Table 820 includes columns corresponding to a categorized cumulative probability of adverse impact and rows corresponding to the level of organizational impact. The selected risk category, risk category 830, is represented by the intersection of the rows and columns. Note that table 820 is based on Table 5 in the NIST "Guide for Conducting Risk Assessments"), and is used only as an example. No particular number of categories, table organization, or security framework is recommended or endorsed.

Figure 9:
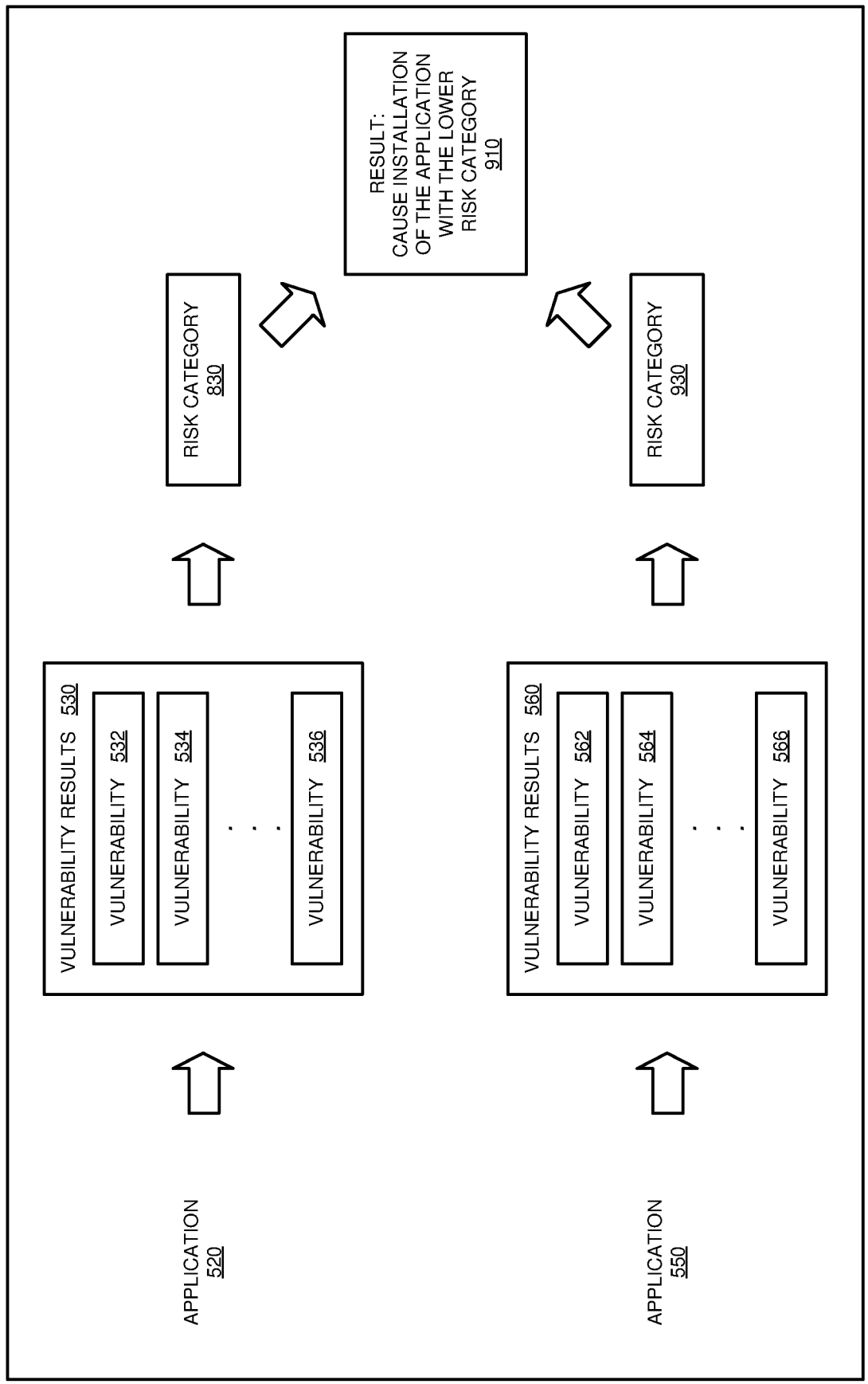
FIG. 9 depicts a continued example of application selection based on cumulative vulnerability risk assessment in accordance with an illustrative embodiment.

With reference to FIG. 9, this figure depicts a continued example of application selection based on cumulative vulnerability risk assessment in accordance with an illustrative embodiment. Applications 520 and 550, vulnerability result set 530 including vulnerabilities 532, 534, and 536, and vulnerability result set 560 including vulnerabilities 562, 564, and 566 are the same as applications 520 and 550, vulnerability result set 530 including vulnerabilities 532, 534, and 536, and vulnerability result set 560 including vulnerabilities 562, 564, and 566 in FIG. 5. Risk category 830 is the same as risk category 830 in FIG. 8.

In a manner similar to the generation of risk category 830, an application has generated risk category 930 corresponding to vulnerability result set 560 of application 550. An application uses risk categories 830 and 930 to compare applications 520 and 550 respectively, and causes result 910, in which a system management application is caused to install whichever of applications 520 and 550 has the lowest risk category.

Figure 10:
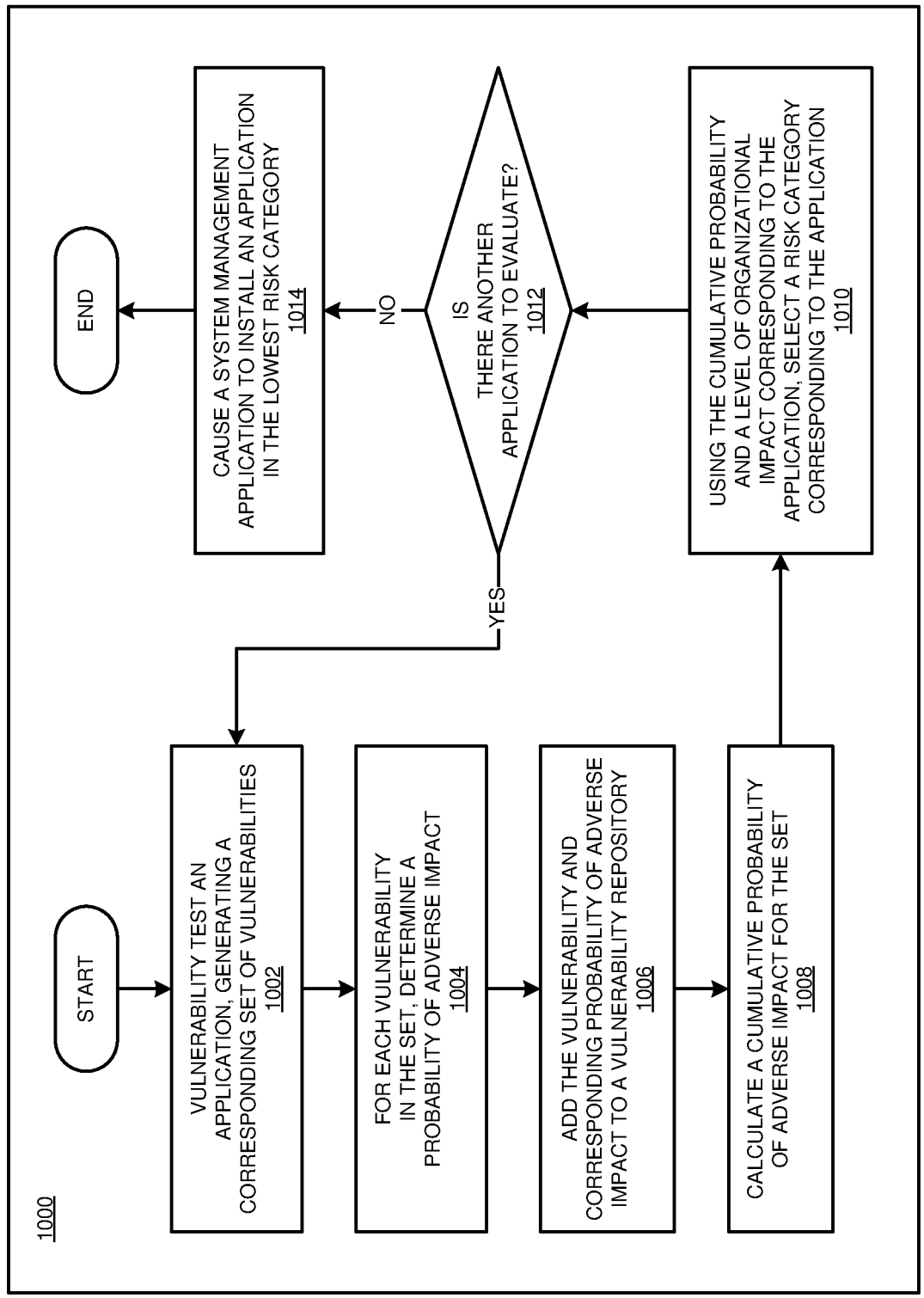
FIG. 10 depicts a flowchart of an example process for application selection based on cumulative vulnerability risk assessment in accordance with an illustrative embodiment.

With reference to FIG. 10, this figure depicts a flowchart of an example process for application selection based on cumulative vulnerability risk assessment in accordance with an illustrative embodiment. Process 1000 can be implemented in application 300 in FIG. 3.

In block 1002, the application vulnerability tests an application, generating a corresponding set of vulnerabilities. In block 1004, the application, for each vulnerability in the set, determines a probability of adverse impact. In block 1006, the application adds the vulnerability and corresponding probability of adverse impact to a vulnerability repository. In block 1008, the application calculates a cumulative probability of adverse impact for the set. In block 1010, the application, using the cumulative probability and a level of organizational impact corresponding to the application, selects a risk category corresponding to the application. In block 1012, the application checks whether there is another application to evaluate. If yes ("YES" path of block 1012), the application returns to block 1002. Otherwise ("NO" path of block 1012), in block 1014, the application causes a system management application to install an application in the lowest risk category. Then the application ends.

Figure 11:
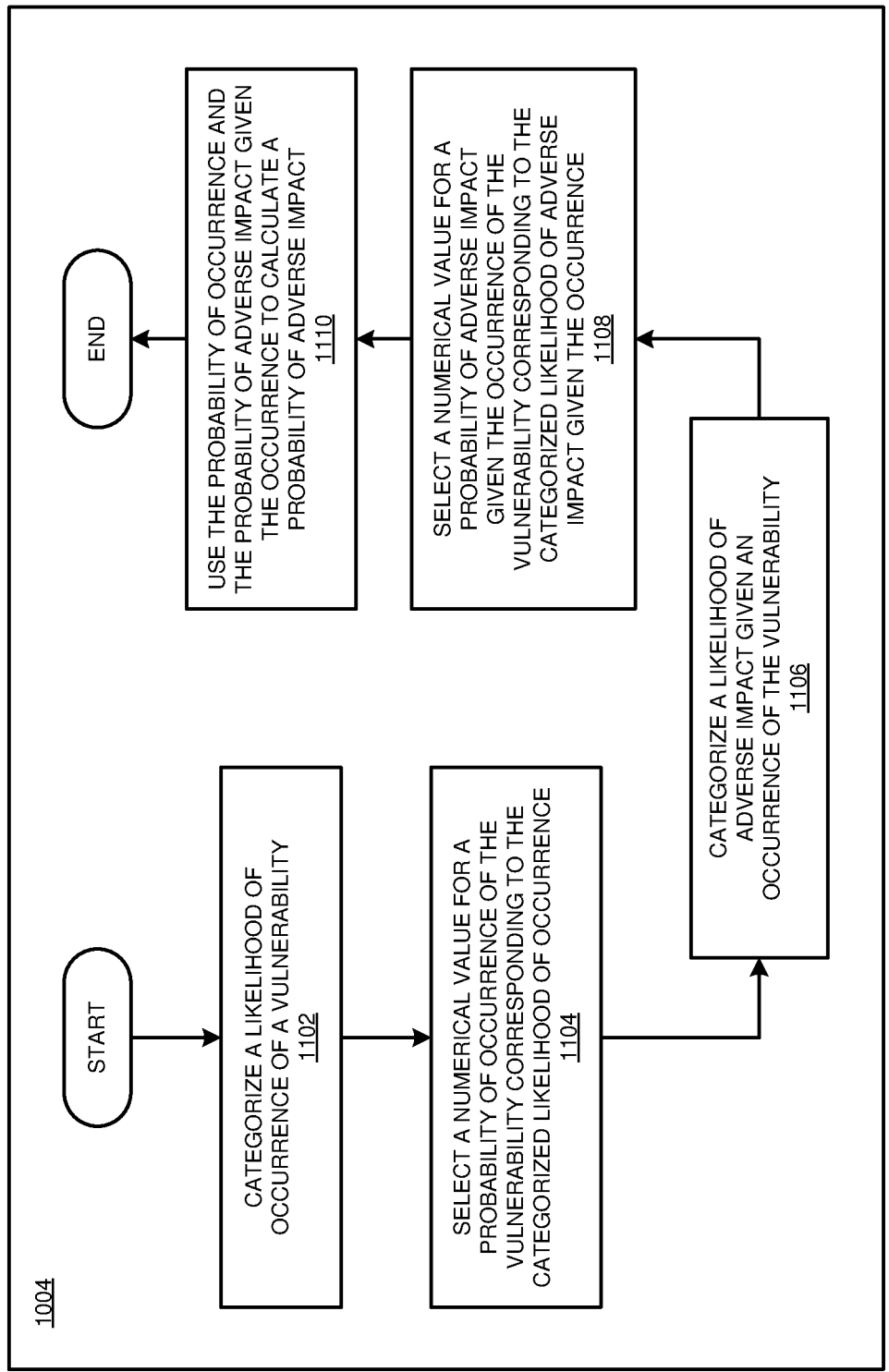
FIG. 11 depicts a flowchart of an example process for application selection based on cumulative vulnerability risk assessment in accordance with an illustrative embodiment.

With reference to FIG. 11, this figure depicts a flowchart of an example process for application selection based on cumulative vulnerability risk assessment in accordance with an illustrative embodiment. In particular, FIG. 11 depicts more detail of block 1004 in FIG. 10.

In block 1102, the application categorizes a likelihood of occurrence of a vulnerability. In block 1104, the application selects a numerical value for a probability of occurrence of the vulnerability corresponding to the categorized likelihood of occurrence. In block 1106, the application categorizes a likelihood of adverse impact given an occurrence of the vulnerability. In block 1108, the application selects a numerical value for a probability of adverse impact given the occurrence of the vulnerability corresponding to the categorized likelihood of adverse impact given the occurrence. In block 1110, the application uses the probability of occurrence and the probability of adverse impact given the occurrence to calculate a probability of adverse impact. Then the application ends.

Figure 12:
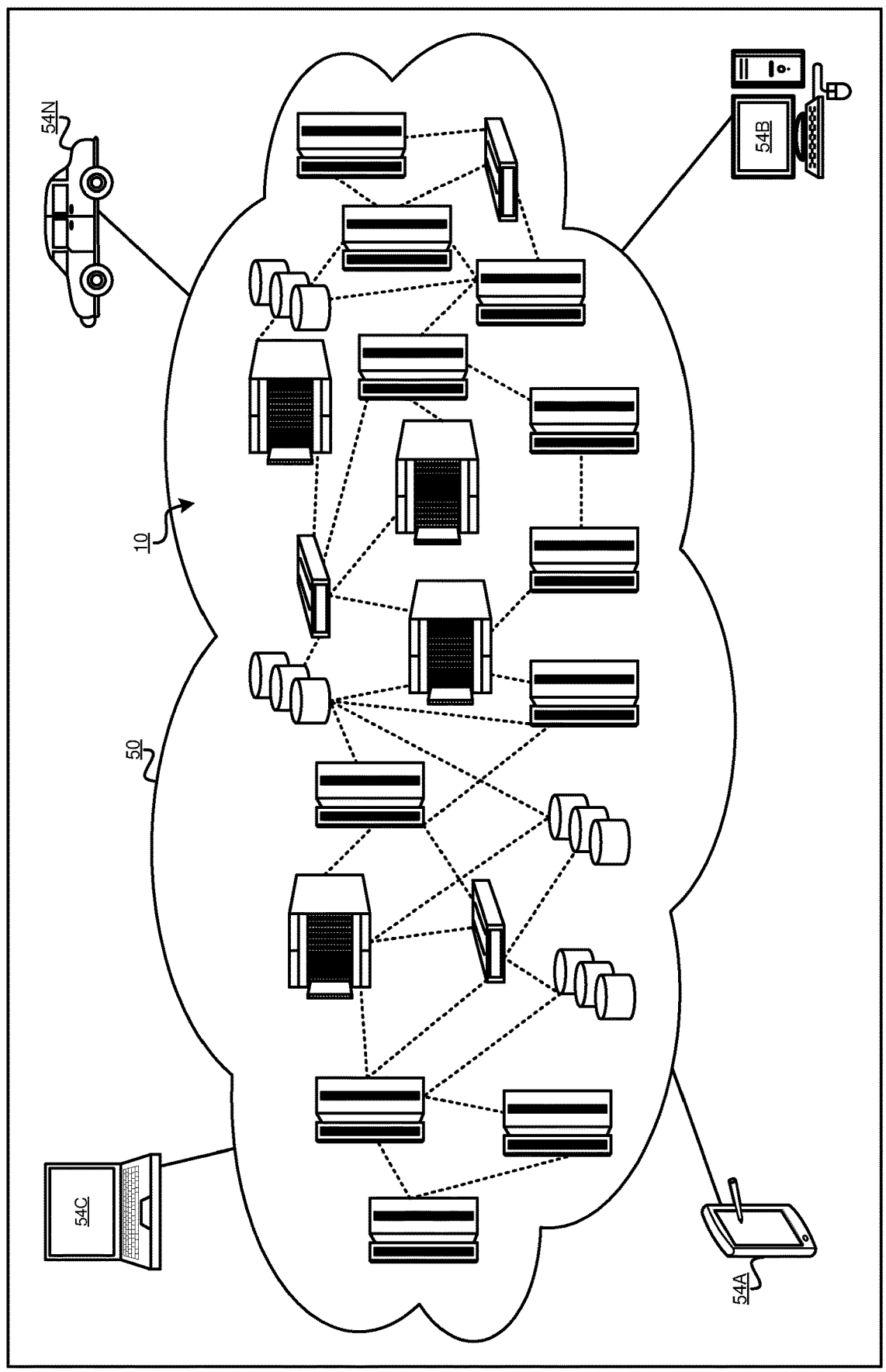
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
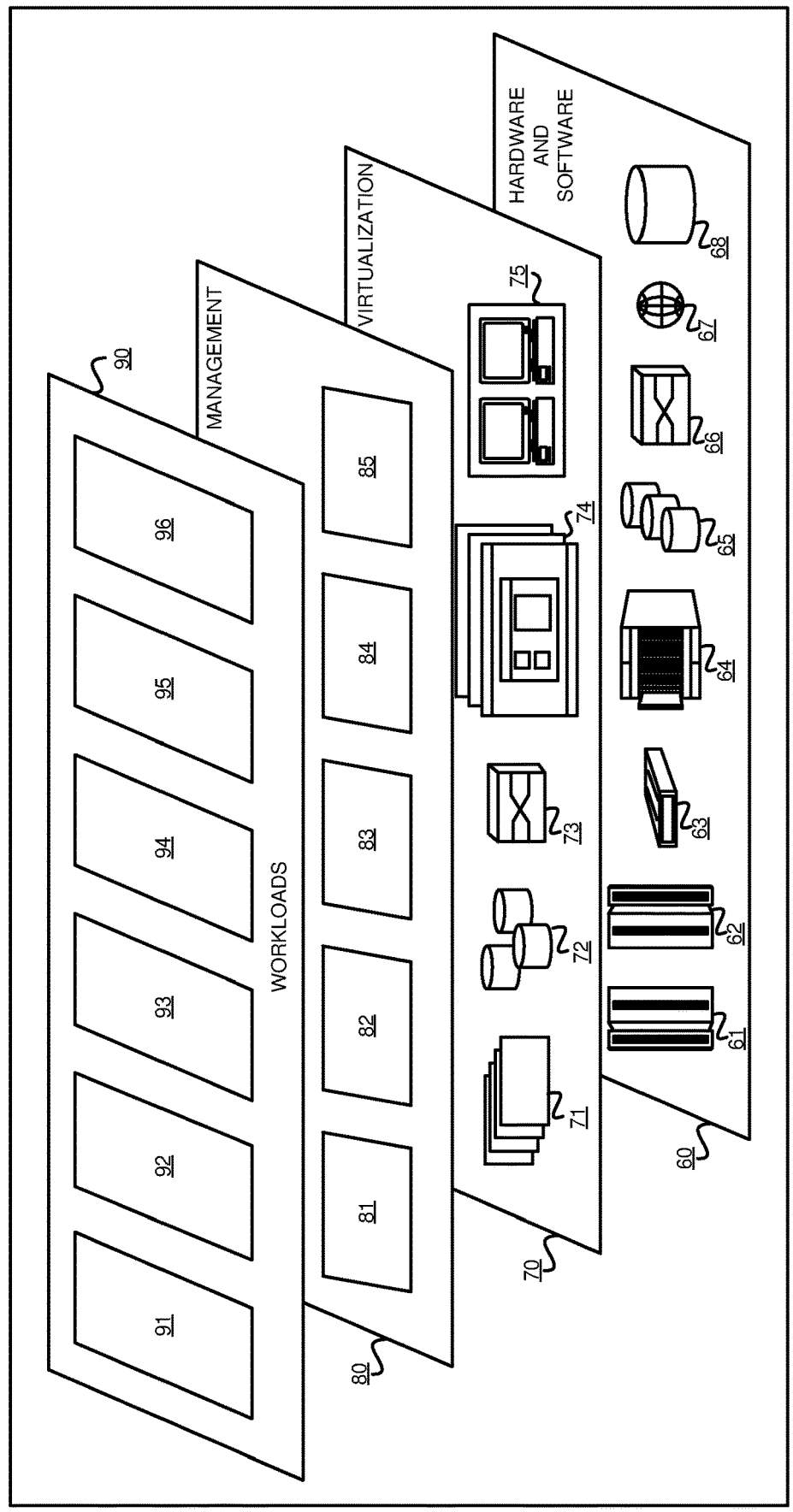
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for application selection based on cumulative vulnerability risk assessment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   executing, using a processor and a memory of a testing system, a set of vulnerability testing instructions relative to an application, the executing causing an output of a set of vulnerabilities from the testing system;
   selecting, from a first set of categories according to a vulnerability type of a first vulnerability in the set of vulnerabilities, a likelihood of occurrence category of the first vulnerability;
   selecting, from a first numerical range corresponding to the selected likelihood of occurrence category, a first numerical value comprising a probability of occurrence of the first vulnerability;
   selecting, from a second set of categories according to the vulnerability type, a likelihood of adverse impact category;
   selecting, from a second numerical range corresponding to the selected likelihood of adverse impact category, a second numerical value comprising a probability of adverse impact given the occurrence of the first vulnerability;
   calculating, using the probability of occurrence and the probability of adverse impact given the occurrence, a first probability of adverse impact corresponding to the first vulnerability;
   modifying a vulnerability repository in a data storage device, by adding to the vulnerability repository the first vulnerability and the first probability of adverse impact;

calculating, using the first probability of adverse impact and a second probability of adverse impact, a first cumulative probability of adverse impact;

assigning to the application, using the first cumulative probability and a first level of organizational impact corresponding to the application, a first risk category; and causing, responsive to the first risk category being lower than a second risk category corresponding to a second application, a system management application to install the application on a computer system, the computer system utilized to execute the installed application.

2. The computer-implemented method of claim 1, wherein selecting, from the first numerical range corresponding to the selected likelihood of occurrence category, the first numerical value comprising the probability of occurrence of the first vulnerability comprises:

selecting a midpoint of the first numerical range.

3. The computer-implemented method of claim 1, wherein selecting, from the first numerical range corresponding to the selected likelihood of occurrence category, the first numerical value comprising the probability of occurrence of the first vulnerability comprises:

selecting a lower bound of the first numerical range.

4. The computer-implemented method of claim 1, wherein calculating, using the first probability of adverse impact and the second probability of adverse impact, the cumulative probability of adverse impact further comprises:

calculating a probability of occurrence of at least one of the first probability of adverse impact and the second probability of adverse impact.

5. The computer-implemented method of claim 1, wherein the second probability of adverse impact corresponds to a second vulnerability in the set of vulnerabilities.

6. A computer program product for application selection based on cumulative vulnerability risk assessment, the computer program product comprising:

one or more computer readable storage media, and program instructions collectively stored on the one or more computer readable storage media, the program instructions when executed by a processor causing operations comprising:

executing, using a processor and a memory of a testing system, a set of vulnerability testing instructions relative to an application, the executing causing an output of a set of vulnerabilities from the testing system;

selecting, from a first set of categories according to a vulnerability type of a first vulnerability in the set of vulnerabilities, a likelihood of occurrence category of the first vulnerability;

selecting, from a first numerical range corresponding to the selected likelihood of occurrence category, a first numerical value comprising a probability of occurrence of the first vulnerability;

selecting, from a second set of categories according to the vulnerability type, a likelihood of adverse impact category;

selecting, from a second numerical range corresponding to the selected likelihood of adverse impact category, a second numerical value comprising a probability of adverse impact given the occurrence of the first vulnerability;

calculating, using the probability of occurrence and the probability of adverse impact given the occurrence, a first probability of adverse impact corresponding to the first vulnerability;

modifying a vulnerability repository in a data storage device, by adding to the vulnerability repository the first vulnerability and the first probability of adverse impact;

calculating, using the first probability of adverse impact and a second probability of adverse impact, a first cumulative probability of adverse impact;

assigning to the application, using the first cumulative probability and a first level of organizational impact corresponding to the application, a first risk category; and causing, responsive to the first risk category being lower than a second risk category corresponding to a second application, a system management application to install the application on a computer system, the computer system utilized to execute the installed application.

7. The computer program product of claim 6, wherein selecting, from the first numerical range corresponding to the selected likelihood of occurrence category, the first numerical value comprising the probability of occurrence of the first vulnerability comprises:

selecting a midpoint of the first numerical range.

8. The computer program product of claim 6, wherein selecting, from the first numerical range corresponding to the selected likelihood of occurrence category, the first numerical value comprising the probability of occurrence of the first vulnerability comprises:

selecting a lower bound of the first numerical range.

9. The computer program product of claim 6, wherein calculating, using the first probability of adverse impact and the second probability of adverse impact, the cumulative probability of adverse impact further comprises:

calculating a probability of occurrence of at least one of the first probability of adverse impact and the second probability of adverse impact.

10. The computer program product of claim 6, wherein the second probability of adverse impact corresponds to a second vulnerability in the set of vulnerabilities.

11. The computer program product of claim 6, wherein the stored program instructions are stored in the at least one of the one or more storage media of a local data processing system, and wherein the stored program instructions are transferred over a network from a remote data processing system.

12. The computer program product of claim 6, wherein the stored program instructions are stored in the at least one of the one or more storage media of a server data processing system, and wherein the stored program instructions are downloaded over a network to a remote data processing system for use in a computer readable storage device associated with the remote data processing system.

13. The computer program product of claim 6, wherein the computer program product is provided as a service in a cloud environment.

14. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to execute, using a processor and a memory of a testing system, a set of vulnerability testing instructions relative to an application, the executing causing an output of a set of vulnerabilities from the testing system;

program instructions to select, from a first set of categories according to a vulnerability type of a first vulnerability in the set of vulnerabilities, a likelihood of occurrence category of the first vulnerability;

program instructions to select, from a first numerical range corresponding to the selected likelihood of occurrence category, a first numerical value comprising a probability of occurrence of the first vulnerability;

program instructions to select, from a second set of categories according to the vulnerability type, a likelihood of adverse impact category;

program instructions to select, from a second numerical range corresponding to the selected likelihood of adverse impact category, a second numerical value comprising a probability of adverse impact given the occurrence of the first vulnerability;

program instructions to calculate, using the probability of occurrence and the probability of adverse impact given the occurrence, a first probability of adverse impact corresponding to the first vulnerability;

program instructions to modify a vulnerability repository in a data storage device, by adding to the vulnerability repository the first vulnerability and the first probability of adverse impact;

program instructions to calculate, using the first probability of adverse impact and a second probability of adverse impact, a first cumulative probability of adverse impact;

program instructions to assign to the application, using the first cumulative probability and a first level of organizational impact corresponding to the application, a first risk category; and program instructions to cause, responsive to the first risk category being lower than a second risk category corresponding to a second application, a system management application to install the application on a computer system, the computer system utilized to execute the installed application.

15. The computer system of claim 14, wherein program instructions to select, from the first numerical range corresponding to the selected likelihood of occurrence category, the first numerical value comprising the probability of occurrence of the first vulnerability comprises:

program instructions to select a midpoint of the first numerical range.

16. The computer system of claim 14, wherein program instructions to select, from the first numerical range corresponding to the selected likelihood of occurrence category, the first numerical value comprising the probability of occurrence of the first vulnerability comprises:

program instructions to select a lower bound of the first numerical range.

17. The computer system of claim 14, wherein program instructions to calculate, using the first probability of adverse impact and the second probability of adverse impact, the cumulative probability of adverse impact further comprises:

program instructions to calculate a probability of occurrence of at least one of the first probability of adverse impact and the second probability of adverse impact.

\* \* \* \* \*